United States Patent [19]
Tappeiner

[11] 3,919,624
[45] Nov. 11, 1975

[54] SELF COMMUTATING STATIC CONVERTER

[75] Inventor: Hermann Tappeiner, Erlangen, Germany

[73] Assignee: Siemens Aktiengesellschaft, Munich, Germany

[22] Filed: Feb. 6, 1975

[21] Appl. No.: 547,601

[30] Foreign Application Priority Data
Feb. 22, 1974 Germany............................ 2408609

[52] U.S. Cl............................................ 321/45 C
[51] Int. Cl.² ................ H02M 7/505; H02M 7/515
[58] Field of Search .......................... 321/45, 45 C

[56] References Cited
UNITED STATES PATENTS

| | | | |
|---|---|---|---|
| 3,395,328 | 7/1968 | Huntzinger et al. | 321/45 C |
| 3,398,350 | 8/1968 | Ruff | 321/45 C |
| 3,405,346 | 10/1968 | Krauthamer | 321/45 C |
| 3,555,397 | 1/1971 | Frank | 321/45 C X |
| 3,612,973 | 10/1971 | Kuniyoshi | 321/45 C X |
| 3,763,417 | 10/1973 | Johnston | 321/45 C X |
| 3,775,662 | 11/1973 | Compoly et al. | 321/45 C X |
| 3,781,644 | 12/1973 | Yatsuk | 321/45 C |
| R27,193 | 10/1971 | Risberg | 321/45 C X |

*Primary Examiner*—William M. Shoop
*Attorney, Agent, or Firm*—Kenyon & Kenyon Reilly Carr & Chapin

[57] ABSTRACT

A self commutating static converter having two main controlled rectifiers in series which are coupled to a d-c supply voltage and including two bypass rectifiers, one associated with each of the main rectifiers and means for forced commutation in which a circuit for recharging the commutation capacitor and for discharging the capacitor back into the d-c supply voltage including a controlled recharging rectifier which is arranged to be fired when the voltage exceeds a predetermined limit is provided to permit the converter to properly function when subjected to varying d-c supply voltages and large load currents.

12 Claims, 4 Drawing Figures

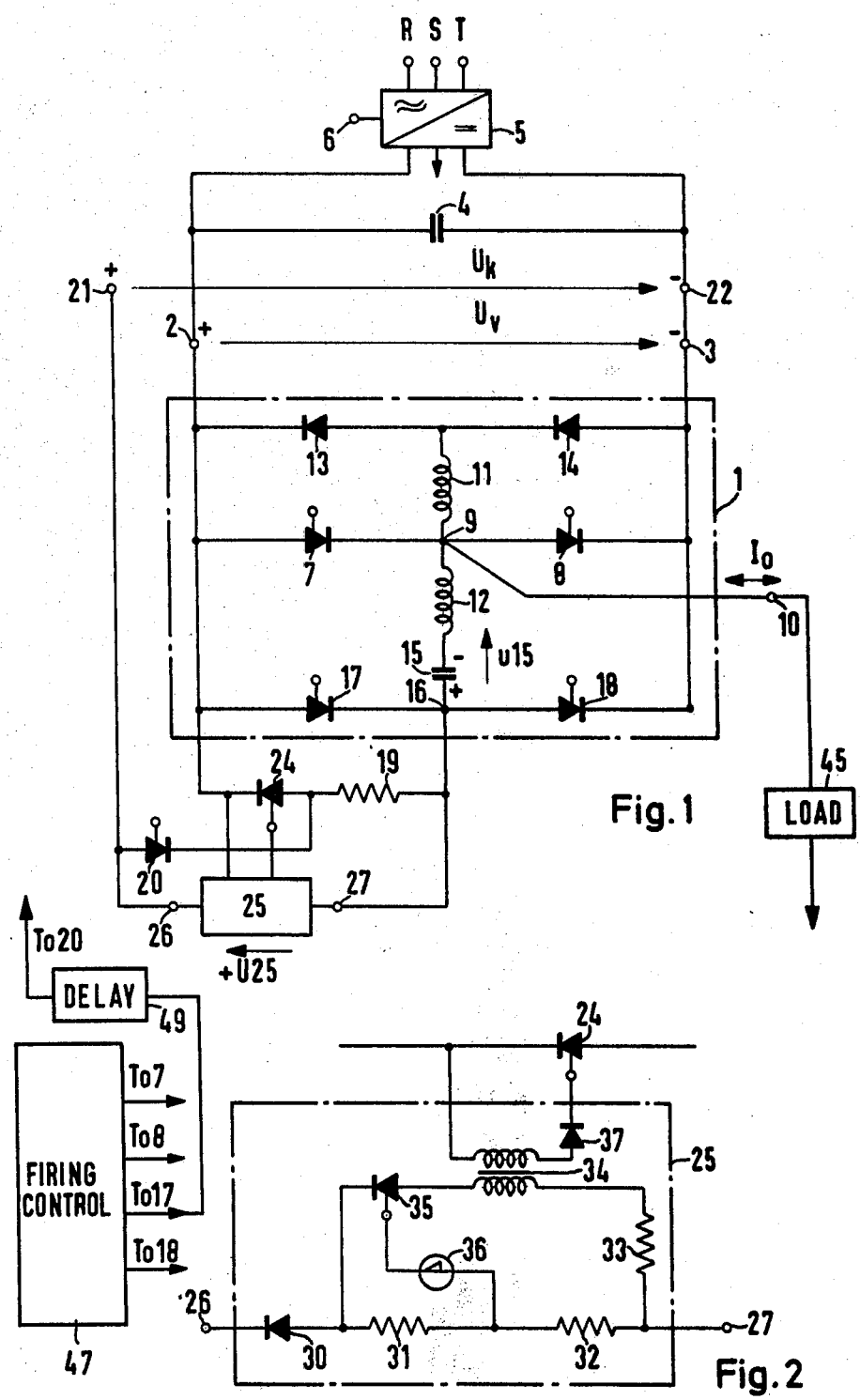

SELF COMMUTATING STATIC CONVERTER

BACKGROUND OF THE INVENTION

This invention relates to self commutating static converters in general and more particularly to an improved arrangement for maintaining a proper charge on the commutation capacitor in such a converter.

A static converter having two main controlled rectifiers in series which can be connected to a d-c supply voltage and which includes a pair of bypass rectifiers, one associated with each of the main rectifiers and means for forced commutation containing at least a commutation choke and commutation capacitor common to both main rectifiers along with quenching rectifiers for extinguishing the two main rectifiers is known from a doctoral dissertation by W. Forstbauer entitled "The Constant Voltage Converter as a Device for the Compensation of Reactive Power", Faculty for Electrical Engineering of RhenisWestphalian Technical University Aachen, 1971, page 127, FIG. 79. In the disclosed arrangement two controlled main rectifiers are connected in series through two limiting chokes. The series circuit is connected to a d-c supply voltage having a constant d-c output. From the connecting line of the two limiting chokes a connection is provided to a resistive-inductive load. An uncontrolled bypass rectifier is associated with each main rectifier. The first bypass rectifier is coupled in series with a first commutation choke with a polarity opposite that of the series circuit consisting of the first main rectifier and the first limiting choke. Similarly the second bypass rectifier is connected in series with the first commutation choke with polarity opposite to the series circuit consisting of the second main rectifier and the second limiting choke. As a result the series circuit of the two bypass rectifiers is connected in the cutoff direction with respect to the d-c supply. At the junction point of the two limiting chokes one end of a second commutation choke whose other end is connected to one electrode of a commutation capacitor is also connected. Between the positive terminal of the d-c voltage source and the other electrode of the commutation capacitor a series circuit consisting of a first controlled quenching rectifier and a third limiting choke is provided. Similarly a series circuit consisting of a fourth limiting choke and a second controlled quenching rectifier is connected between the other electrode of the commutation capacitor and the negative terminal of the d-c source. Through this arrangement the commutation capacitor can be used in an alternating fashion for extinguishing both main rectifiers.

This previously developed converter is distinguished by its simple design. However, it has a particular disadvantage in the fact that the voltage at the commutation capacitor depends on the magnitude of the d-c supply voltage. If, for example, a rectifier utilizing either controlled and/or uncontrolled rectifiers is used as the d-c voltage supply, the d-c supply voltage can fluctuate within large limits. Similar fluctuations can occur also if the static converter is supplied from a d-c control element or a controlled rectifier through an intermediate link with controlled or regulated intermediate link voltages, i.e., if what is referred to as an intermediate link converter with a smoothing capacitor in the intermediate link is involved. If the d-c supply voltage is at a sufficiently low value, the ability of the converter to commutate can no longer be reliably insured.

This previously developed converter has a further disadvantage. The voltage at the commutation capacitor depends on the magnitude of the load current delivered. In cases of large load current, overchanging of the capacitor can occur, i.e., it can be charged beyond the value which is sufficient for reliable commutation. As a result its voltage can reach dangerously high values. The possibility of this occurring must be taken into account when designing the commutation capacitor and other components and as a result increases the manufacturing parts of converter, i.e., the converter must be over-designed in order to take care of this situation.

In view of this, the need for improved static converter of this general type which can properly function with variable d-c voltages and large load currents without requiring an expensive design becomes evident. Such a converter must maintain full commutation ability even if a d-c supply voltage is low and must avoid excessive voltages at the commutation capacitor even for large load current.

SUMMARY OF THE INVENTION

The present invention solves this problem and provides such a converter. This is done by installing a recharging branch consisting of a recharging resistor and controlled recharging rectifier in series for use in recharging the commutation capacitor from an auxiliary voltage source. In addition means are provided for discharging the commutation capacitor back into the d-c supply voltage source through a controlled discharging rectifier which is fired when the voltage at the commutation capacitor exceeds a predetermined limit.

Through this arrangement the commutation capacitor is recharged through the recharging branch with a preferably constant auxiliary d-c voltage. As a result the necessary voltage for commutation can be maintained even when the variable d-c supply voltage is at low values. Thus, in each case, the necessary voltage of the commutation capacitor will be reached prior to the time for extinguishing the main rectifier so that the commutation capacitor can provide the voltage which is necessary for proper commutation thereby permitting the converter to always have its full commutation capacity. In order to prevent the commutation capacitor from being overcharged when the load current is very large, discharging the commutation capacitor through a discharging rectifier back into the d-c supply voltage source is provided. In principle it would be possible to provide for discharging back through a diode into the auxiliary voltage source instead. However, such would require an auxiliary voltage source capable of absorbing power. Many voltage sources do not have this capability and in any case to provide such capability would increase the cost of the arrangement. The d-c supply voltage source for the converter is, however, as a rule, capable of absorbing power particularly when an intermediate link with a smoothing capacitor is involved.

The arrangement of the present invention is constructed so that a discharging back into the d-c supply voltage through the discharging rectifier takes place if the voltage at the commutation capacitor is too high and recharging from the auxiliary source through the recharging rectifier occurs so that the voltage at the commutation capacitor required for commutation is again reached. Through repeated recharging the dependence of the commutation capacitor voltage on the d-c supply voltage is eliminated with its troublesome dependence on the magnitude of the load current is eliminated by the controlled discharging.

One particular advantage of the present invention is that any static converter of the general type mentioned above can be employed with slight and inexpensive addition as an inverter in an intermediate link converter with variable link voltage.

Generally provision will be made that the discharging rectifier is connected in series with a discharging resistor in order to limit the discharged flowing into the d-c supply voltage source. The discharging resistor can have the same resistance as the recharging resistor. In accordance with a particular simple embodiment of the invention the recharging resistor also serves the function of the discharging resistor thereby saving a separate discharging resistor. In such an arrangement the discharging rectifier is connected between one terminal of the d-c supply voltage source and the junction of the recharging resistor and recharging rectifier.

For a controlled firing of the discharging rectifier, a firing circuit is illustrated which compares an input voltage proportional to the voltage at the commutation capacitor with a predetermined limit. It is possible to use a voltage taken directly from the commutation capacitor as the input voltage to the firing circuit. It is more practical, however, to provide instead the voltage between one electrode of the commutation capacitor and one terminal of the auxiliary voltage source as the input voltage to the firing circuit. By using this latter voltage, a voltage having a smaller magnitude than that of the voltage at the commutation capacitor can be employed. This voltage is a difference voltage which is obtained from the voltage at the commutation capacitor less the auxiliary d-c voltage of the auxiliary voltage source. As a result the firing circuit need be designed for only relatively small voltage values. If this voltage is used a further advantage is obtained in that it leads to an automatic limitation of the length of the firing pulse which is applied to the discharging rectifier. The reason for this is that this voltage becomes zero and firing is interrupted if the magnitude of the voltage at the commutation capacitor becomes smaller than the auxiliary d-c voltage.

In this embodiment just mentioned recharging and discharging take place with ever second commutation. As illustrated by a further embodiment of the invention it is possible to provide for discharging and recharging after each commutation. To accomplish this so that the commutation capacitor can be recharged at opposite polarities a further recharging branch is included consisting of the series circuit of a further recharging resistor and further controlled recharging rectifier. This is connected to an additional auxiliary voltage source. For discharging the commutation capacitor into the d-c supply voltage source when charged with an opposite polarity an additional controlled discharged rectifier is included which will be fired when the voltage of opposite polarity at the commutation capacitor has exceed a predetermined limit.

This arrangement involves practically a doubling of the recharging branch and discharging branch in order that recharging and discharging can take place for both polarities of the commutation capacitor. The additional recharging branch and discharging branch become effective only when the polarity of the commutation capacitor is reversed. Because of this it is possible to use a single resistor for all recharging and discharging, the single resistor being shared with both recharging and discharging branches.

BRIEF DESCRIPTION OF THE DRAWINGS

FIG. 1 is a schematic diagram of a self commutating static converter having a recharging branch and discharging branch in accordance with the present invention.

FIG. 2 is a circuit diagram illustrating an embodiment of a firing circuit for the discharging rectifier of the discharging branch of FIG. 1.

DETAILED DESCRIPTION OF THE PREFERRED EMBODIMENT

Figure 3:
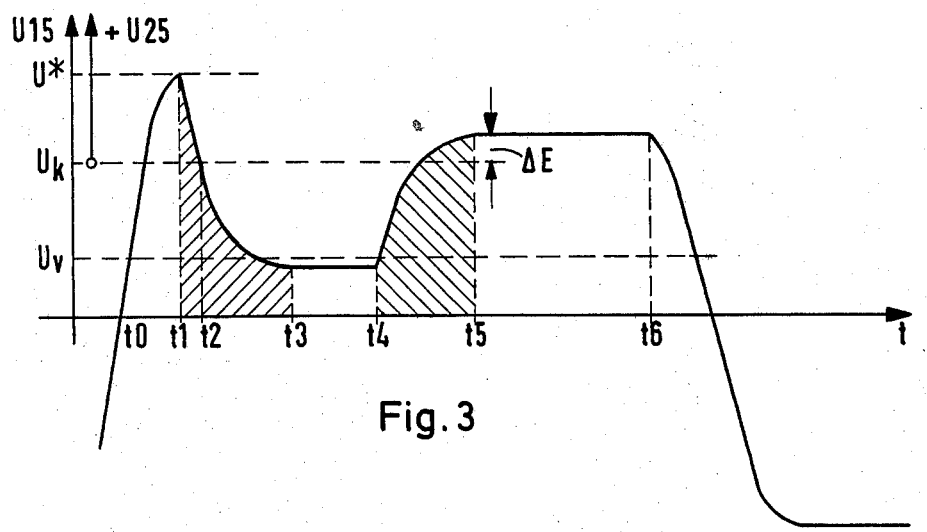
FIG. 3 is a waveform diagram helpful in understanding the operation of the circuit of FIG. 1.

FIG. 1 is a schematic diagram illustrating a self commutating static converter operating as an inverter. On the d-c side, the inverter has terminals 2 and 3 which are connected respectively to the positive and negative output of a d-c supply voltage having a d-c supply voltage $U_v$ which fluctuates In the illustrated embodiment the converter 1 is part of a voltage link converter which in addition contains an intermediate voltage link with a smoothing capacitor 4 and a controlled rectifier 5. The rectifier 5 which will typically include controlled rectifier elements such as thyristors in a bridge circuit is fed from a three-phase a-c voltage system having phase conductors R, S and T. In conventional fashion it has a control input designated 6. The level of the d-c supply voltage $U_v$ and thus the magnitude of the output voltage of the converter 1 can be controlled or regulated by means of a control input 6. In place of the controlled rectifier 5, a d-c control element for changing the d-c supply voltage $U_v$ may be provided instead.

The self commutating static converter 1 includes two main controlled main rectifiers 7 and 8 which will preferably be thyristors connected in series across the d-c voltage $U_v$. These are connected across the voltage in the forward direction as illustrated. The junction point 9 of the two main rectifiers 7 and 8 is connected to the terminal 10 of a resistive inductive load 45. Also coupled to the junction 9 are first and second commutation choke 11 and 12. Uncontrolled bypass rectifiers 13 and 14 are connected across the d-c voltage with a polarity opposite to that of the main controlled rectifier. Their junction point is coupled to the other side of the commutation choke 11.

Also associated with the main rectifier 7 and 8 is an arrangement for the forced commutation of the load current $I_o$. This arrangement includes a commutation capacitor 15 common to both main controlled rectifiers 7 and 8 having its one electrode connected to the other side of the commutation choke 12. Its other electrode designated 16 on FIG. 1 is coupled to the junction point of two controlled rectifiers 17 and 18 in series across the terminals 2 and 3 of the d-c voltage. These two controlled rectifiers are quenching rectifiers. Controlled quenching rectifier 17 permits shunting the commutation capacitor 15 across the first main rectifier 7 and controlled quenching rectifier 18 permits shunting the capacitor across the controlled main rectifier 8. These two quenching rectifiers 17 and 18 will preferably be thyristors and, as shown, are connected in series with each other in the forward direction between the terminals 2 and 3.

For the purpose of recharging the capacitor 15 a recharging branch is provided. This branch includes the series circuit comprising the recharging resistor 19 and a controlled recharging rectifier 20. Again this will preferably a thyristor as will all illustrated controlled rectifiers. The series circuit comprising the resistor 19 and controlled rectifier 20 are connected between a positive terminal 21 of an auxiliary voltage source, not shown in detail, and the lower electrode 16 of the commutation capacitor 15. A constant auxiliary d-c voltage $U_k$ is applied between the positive terminal 21 and a negative terminal 22 which is connected to the terminal 3. Generally the d-c supply voltage $U_v$ is equal to or smaller than the auxiliary d-c voltage $U_k$. Through firing of the recharging rectifier 20, the lower electrode 16 of the commutation capacitor is positively recharged relative to the other electrode as illustrated. This recharging takes place in the path from the terminal 21 through the recharging rectifier 20, the recharging resistor 19, the commutation capacitor 15, the commutation choke 12, the junction point 9 and the main rectifier 8 to the terminal 22. If the load current $I_o$ is larger than the recharging current, then the load currenet at the junction 9 is made up of the recharging current and a current flowing through the terminal 3, rectifier 14 and choke 11 with no current flowing through the main rectifier 8.

To discharge the commutation capacitor 15 back into the d-c supply voltage source, in the present case into the intermediate voltage link containing the smoothing capacitor 4, a controlled discharging rectifier 24 is provided. The rectifier which is preferably a thyristory is triggered if the voltage $U_{15}$ at the commutation capacitor exceeds a predetermined limit $U^*$ indicating that it is to high. The discharging rectifier 24 has its cathode connected to the positive terminal 2 and its anode to the junction between the recharging resistor 19 and recharging rectifier 20. This forms a discharge path comprising the recharging resistor 19 in series with the discharging rectifier 24. Thus the recharging resistor 19 is used both as a recharging resistor and a discharging resistor. Discharge back into the d-c supply voltage source takes place in the path from the lower electrode 16 of the commutation capacitor 15 through the recharging resistor 19, the discharging rectifier 24, the terminal 2, the d-c supply voltage source, the terminal 3, the bypass rectifier 4, the first commutation choke 11, the junction 9 and the second commutation choke 12 to the upper electrode of the commutation capacitor 15.

A firing circuit 25 is provided for firing the discharge controlled rectifier 24. In the illustrated embodiment its two input terminals 26 and 27 are connected respectively to the positive terminal 21 of the auxiliary voltage source and the lower electrode 16 of the capacitor 15. This will result in a voltage U25 being developed at the firing circuit 25 which is proportional to the voltage on the capacitor 15. In the present case rather than using the voltage U15 directly this proportional voltage U25, which will be the difference between the auxiliary supply voltage and the voltage U15 at the commutation capacitor, is used. This is particularly advantageous in that a firing pulse for the discharging rectifier 24 can be formed only when the voltage U15 is larger than the auxiliary d-c voltage $U_k$. Clearly, as illustrated by FIG. 1 the voltage $U25 = U15 - U_k$. It is a further advantage that the positive input voltage U25 is always smaller than the voltage U15 and is generally also smaller than the auxiliary d-c voltage $U_k$ thereby permitting the firing circuit 25 to be constructed from components of low voltage rating.

FIG. 2 illustrates an embodiment of a firing circuit 25 for firing the discharge rectifier 24 of FIG. 1. As illustrated the input terminals 26 and 27 are connected together through a series circuit comprising a diode 30 and two series resistors 31 and 32. These two resistors form a voltage divider. The diode 30 prevents current from flowing through the voltage divider if the input voltage U25 is negative. The voltage divider made up of the resistance 31 and 32 is shunted by a series circuit comprising a limiting resistor 33, the primary winding of a transformer 33 and an auxiliary controlled rectifier having a polarity in the current flow direction of the diode 30. Preferably the auxiliary control rectifier 35 will be a thyristor. A control electrode of the auxiliary control rectifier 35 is connected to the the tap of the voltage divider made up of resistors 31 and 32 through voltage comparison means 36. These voltage comparison means can be a Zener diode or, as shown, a Shockley Diode. The breakdown voltage of the voltage comparison means 36 is selected, taking into consideration the division ratio of the resistors 31 and 32, to be equal to the voltage difference $U^* - U_k$, where $U^*$ is a predetermined limit for the voltage U15 and $U_k$ again designates the value of the auxiliary d-c voltage. Since the auxiliary d-c voltage is constant this voltage difference represents the predetermined limit value $U^*$ with which the voltage of the commutation capacitor 15 is to be compared and which it should not exceed. The secondary winding of the transformer 34 is connected in series with a blocking diode 37 to the control path of the discharging controlled rectifier 24.

If the positive input voltage U25 at the input terminals 26 and 27 exceeds the predetermined voltage difference $U^* - U_k$, and if the voltage at the resistor 31 exceeds the breakdown voltage at the voltage comparison means 36, then the voltage comparison means 36 couples a firing voltage to the auxiliary controlled rectifier 35 which then conducts. A control pulse is thus transmitted by transformer action to the control path of the discharging rectifier 24. The energy for the control pulse is obtained from the input voltage U25. As a result a separate source of firing energy is not required.

FIG. 3 illustrates the wave shape of the voltage U15 of the commutation capacitor 15 as a function of time $t$ for discharging and replenishing. On the ordinate the d-c supply voltage $U_v$, the auxiliary d-c voltage $U_k$, and the predetermined limit value $U^*$ are illustrated. Also shown on the diagram is the input voltage U25 which is measured with respect to the auxiliary d-c voltage $U_k$.

The time interval prior to $t_1$ will first be considered. It is assumed that prior to time $t_0$ the commutation capacitor 15 was charged with a polarity other than that shown in FIG. 1., i.e., it was charged negatively, and that the quenching rectifier 17 was fired to extinguish the main rectifier 7. This and all other firing of rectifiers 7, 8, 17 and 18 will be from a firing control circuit 47 of conventional design. The capacitor charge is reversed during the quenching process through the elements 12, 11, 13 and 17. Beginning with the time $t_0$ the voltage U15 at the commutation capacitor 15 takes on a positive polarity as indicated by FIG. 3.

At time $t_1$ the voltage U15 has reached the predetermined limit $U^*$. Thus, the measured input voltage U25 has also reached the predetermined voltage difference $U^* - U_k$. At this moment the discharging rectifier 24 is fired by the firing ciurcuit 25. The commutation capacitor is discharged through the above noted discharging path including the elements 19, 24, 2, 3, 14, 11, 9 and 12 into the d-c supply voltage source. The current conduction ($t2 - t1$) of the dischar rectifier is shown on FIG. 3 by shading. At any point after time $t_1$ the second main rectifier 8 can be fired. At the time $t_2$ the voltage U15 has again become equal to the auxiliary d-c voltage $U_k$. At this point the firing pulse for the discharging rectifier 24 is terminated.

At the time $t_3$, the discharging is completed after an aperiodic transient. The circuit made up of the chokes 11 and 12, capacitor 15 and resistor 19 is designed so that such an aperiodic transient occurs. The voltage U15 is, beginning at the time $t_3$, at a value slightly below that of the d-c supply voltage $U_r$ so that the difference of two voltages is present as a reverse voltage on the discharging rectifier 24.

At time $t_4$, the recovery protection time ($t4 - t3$) of the discharging rectifier 24 has ended. From the time $t1$ until, at the latest, this time $t4$ the second main rectifier 8 must be fired. At this time $t4$ or any later time the recharging rectifier 20 may be fired. In the presently illustrated embodiment the recharging rectifier 20 is fired exactly at the time $t4$. This can be accomplished by firing means which are designed essentially as a time delay stage 49 fed on the input side with the firing pulse for the quenching rectifier 17. Such a time delay stage or time delay means will be set to a constant value in which the recovery protection time ($t4 - t3$) of the discharging rectifier 24 is also taken into consideration. Beginning at time $t4$ the recharging rectifier 20 carries current to recharge the commutation capacitor 15 through the recharging path made up of the elements 21, 20, 19, 15, 12, 9 and 22, for example, in the case of a low load current.

Recharging is terminated at the time $t5$. The recharging time ($t5 - t4$) during which recharging takes place is pointed out in the FIG. 3 by shading. At the time $t5$ the voltage U15 of the commutation capacitor 15 is above the auxiliary d-c voltage $U_k$ by a voltage amount $\Delta E$ and is somewhat below the limit $U^*$. The voltage value $\Delta E$ is present as a reverse voltage at the recharging rectifier 20. The magnitude of this voltage value $\Delta E$ is adjusted through the choice of the recharging resistor 19. The replenishing process likewise has an aperiodic transient.

The recovery protection time of the recharging rectifier 20 extends from time $t5$ until $t6$. At the end of the protection time ($t6 - t5$) or later, the quenching rectifier 18 can be fired to extinguish the main rectifier 8. As illustrated on the FIG. at the time beginning with time $t6$ onward the commutation capacitor is again charged to a negative polarity once the quenching rectifier 18 has fired.

Examination of FIGS. 1 and 3 shows that recharging and discharging takes place only every second commutation of the self commutation capacitor. In the example shown it always takes place following the extinction of the main rectifier 7. For most applications this is sufficient. However, the further development of the converter 1 of FIG. 1 is possible in which discharging and recharging takes place after each commutation. Such a static conveter is illustrated on FIG. 4. On this FIG. components which are the same as those of FIG. 1 are given the same reference symbols and will not be explained in detail. The arrangement illustrated is identical to that of FIG. 1 with the exception that an additional recharging and discharging branch is provided. The elements associated with the second branch are designated with the same numerals as the corresponding elements in the first branch but with the numerals having a prime associated therewith.

Figure 4:
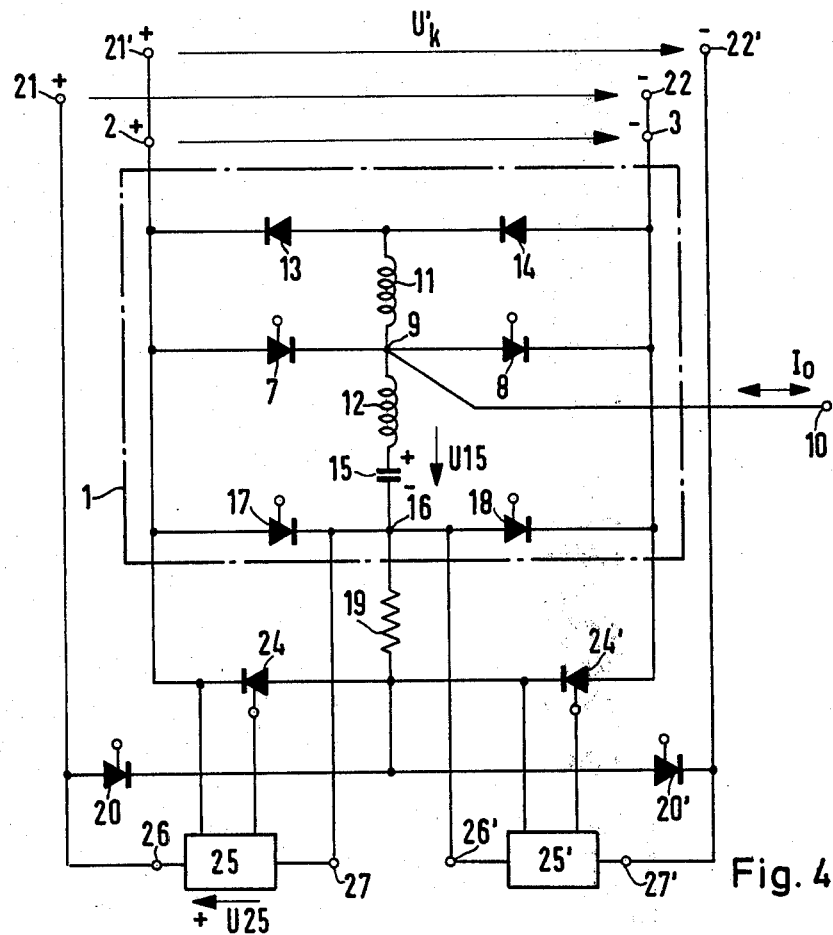
FIG. 4 is a schematic diagram illustrating a self commutating converter having two recharging branches and two discharging branches.

Thus, as shown on FIG. 4 an additional recharging branch for the commutation capacitor 15 to charge it with negative polarity is illustrated. Included are an additional recharging rectifier 20', an additional discharging rectifier 24' and an additional firing circuit 25' having as inputs the terminals 26' and 27'. The additional branch uses the same resistor 19 as is used in the first branch for recharging and discharging. The additional recharging branch which includes the resistor 19 and recharging rectifier 20' is connected between the lower terminal 16 of the capacitor 15 and the negative terminal 22 of an auxiliary voltage source. This is an additional auxiliary voltage source and as illustrated has an auxiliary voltage $U'_k$. Its negative terminal is designated 22' and its positive terminal 21' with the positive terminal 21' connected to the positive terminal 2 of the d-c voltage source. Typically this auxiliary source $U'_k$ will have the same absolute voltage value as the auxiliary d-c voltage $U_k$. In the manner explained above the additional recharging rectifier 20' will be fired using a firing device which is arranged to supply a triggering pulse at a constant time interval after the firing of the quenching rectifier 18.

For discharging the commutation capacitor 15 when charged with negative polarity as shown back into the d-c supply voltage source such as an intermediate link with a smoothing capacitor, the additional discharging controlled rectifier 24', preferably a thyristor, is used. This discharging rectifier 24' is a portion of a discharging branch which also includes the recharging resistor 19. The anode of the discharging rectifier 24' is connected to the terminal 3 and its cathode to the recharging resistor 19. Firing of the discharging rectifier 25 is accomplished by the fire circuit 25' whose input terminals 26' and 27' are connected to the lower electrode 16 of the commutation capacitor 15 and the terminal 22' respectively. Firing circuit 25' may be of the same design as firing circuit 25, i.e., the circuit shown on FIG. 2. It is designed so that it triggers the discharging rectifier 24' when the negative voltage U15 at the commutation capacitor 15 has exceeded a predetermined limit $U^*$.

The function of the additional recharging branch made up of resistor 19 and recharging rectifier 20 and the additional discharging branch made up of resistor 19 and discharging retifier 24' are the same as those of the first recharging branch made up of the resistor 19 and recharging recharging 20 or the discharging branch made up of resistor 19 and discharging retifier 24 described above in connection with FIG. 1.

Thus, an improved arrangement for a self commutating static convertor which permits operating properly when the input voltage varies between wide limits and capable of operating with varying load currents using a low cost design has been shown. Although specific embodiments have been illustrated and described, it will be obvious to those skilled in the art that various modifications may be made without departing from the spirit of the invention which is intended to be limited by the appended claims.

What is claimed is:

1. In a self commutating static converter of the type having two controlled main rectifiers in series which are connected across a d-c supply voltage source, a by-pass rectifier being associated with each of the main rectifiers, and having an arrangement for forced commutation containing at least one commutation choke and a commutation capacitor which is common to both main rectifiers and is used, along with an individual quenching rectifier associated each main rectifier, in order to extinquish the main rectifiers, the improvement comprising;
  a. an auxiliary voltage source;
  b. a controlled recharging rectifier having one side coupled to said auxiliary voltage source;
  c. a recharging resistor coupling the other side of said recharging rectifier to the commutation capacitor;
  d. a controlled discharging rectifier coupling said commutation capacitor to the d-c supply voltage source; and
  e. means for firing said discharge rectifier when the voltage at the commutation capacitor exceeds a predetermined limit.

2. A converter according to claim 1 wherein said discharging rectifier is connected in series with a discharging resistor.

3. A converter according to claim 1 wherein said recharging resistor is used as the discharging resistor.

4. A converter according to claim 3 wherein said discharging rectifier is coupled between the terminal of the d-c supply voltage and the junction of the recharging resistor and recharging rectifier.

5. A converter according to claim 1 wherein said means for firing said discharging rectifier includes means for comparing an input voltage which is proportional to the voltage at the commutation capacitor with a predetermined limit.

6. A converter according to claim 5 wherein said voltage proportional to the voltage on the commutation capacitor is the voltage beween one electrode of said commutation capacitor and a terminal of said auxiliary voltage source.

7. A converter according to claim 5 wherein said means for comparing includes one of a Zener and a Shockley diode for making the voltage comparison.

8. A converter according to claim 1 and further including an additional recharging and discharging arrangement comprising:
  a. an additional voltage source;
  b. an additional recharging resistor;
  c. an additional controlled recharging rectifier;
  d. an additional controlled discharging rectifier; and
  e. means to fire said additional discharging rectifier when a voltage of opposite polarity at said commutation capacitor has exceeded a predetermined limit.

9. A converter according to claim 8 wherein said recharging resistor is used as said further recharging resistor.

10. A converter according to claim 9 wherein said further discharging rectifier is connected in series with a further discharging resistor.

11. A converter according to claim 10 wherein said further recharging resistor is used as the further discharging resistor.

12. A converter according to claim 1 and further including means for firing said controlled recharging valve, said means comprising time delay means with a constant time delay having as an input the firing pulses for a quenching rectifier.

* * * * *

UNITED STATES PATENT AND TRADEMARK OFFICE
CERTIFICATE OF CORRECTION

PATENT NO. : 3 919 624
DATED : November 11, 1975
INVENTOR(S) : Hermann Tappeiner It is certified that error appears in the above-identified patent and that said Letters Patent are hereby corrected as shown below:

Column 2, line 4, change "overchanging" to --overcharging--

Signed and Sealed this second Day of March 1976

[SEAL]

Attest:

RUTH C. MASON
*Attesting Officer*

C. MARSHALL DANN
*Commissioner of Patents and Trademarks*